Figure 1:
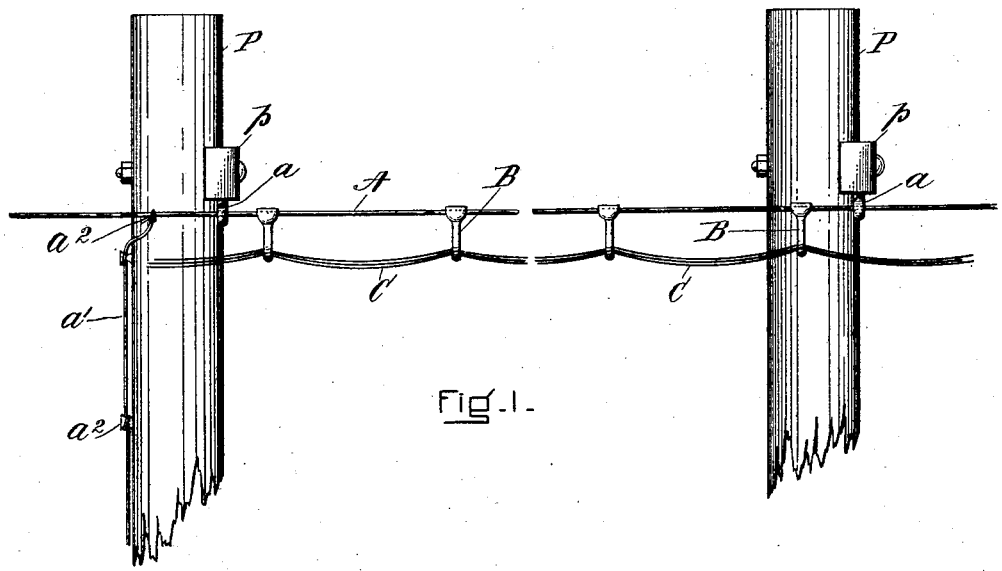

No. 714,718. Patented Dec. 2, 1902.
F. C. LOCKE.
OVERHEAD CONDUIT FOR ELECTRICAL SERVICE WIRES.
(Application filed May 31, 1902.)
(No Model.)

WITNESSES:
Joseph T. Brennan
Grace E. Gibbons

INVENTOR:
Fred C. Locke
by Roberts & Mitchell
Attorneys.

UNITED STATES PATENT OFFICE.

FRED C. LOCKE, OF BOSTON, MASSACHUSETTS.

OVERHEAD CONDUIT FOR ELECTRICAL-SERVICE WIRES.

SPECIFICATION forming part of Letters Patent No. 714,718, dated December 2, 1902.

Application filed May 31, 1902. Serial No. 109,615. (No model.)

*To all whom it may concern:*

Be it known that I, FRED C. LOCKE, a citizen of the United States, and a resident of Boston, in the county of Suffolk and State of Massachusetts, have invented new and useful Improvements in Overhead Conduits for Electrical-Service Wires, of which the following is a specification.

My invention relates to the distribution of electrical service, and is especially adapted for use in telephone systems where, as in suburban districts, the wires are led to subscribers by suspension on poles and trees. Wires of the character required for telephone-service in the best modern practice are led in pairs from the central station or exchange to the several subscribers. These pairs of wires are either incorporated in a cable with many other similar pairs or may consist of individual insulated wires where the general service does not require the use of the cable, and often the distribution system includes both cables and separate wires. Telephone-cables are extremely expensive and as a rule are ill adapted to overhead and suburban work where the subscribers are scattered over a large territory and there is not opportunity for connecting a large number of subscribers' connections at the terminus of a cable. Moreover, where cables are used for overhead distribution they have to be suspended from stout supporting-wires and led to as convenient a point for distribution as the neighborhood permits. From this point the individual insulated wires or pairs of wires are led to the subscribers' houses. For the most part in suburban and country work the individual insulated wires are employed and span the spaces from pole to pole in the ordinary manner peculiar to overhead telephone and telegraph wires. The insulation of the telephone-wires is of considerable thickness, being much greater than the diameter of the wire itself, so that the insulation weighs as much as, if not more than, the wire. Thus a very severe strain is put upon the wire by a span suspension shorter than is considered proper for the ordinary telegraph-wire, and this circumstance has compelled the adoption of wires heavier than necessary for the electrical conditions of telephone-service in order to secure sufficient metallic strength to sustain the ordinary strain of outdoor service.

My invention enables the installation of suburban and country telephone systems to be established and maintained with much less expense than heretofore and with far greater convenience which will be obvious from the description of my invention which follows.

Figure 2:
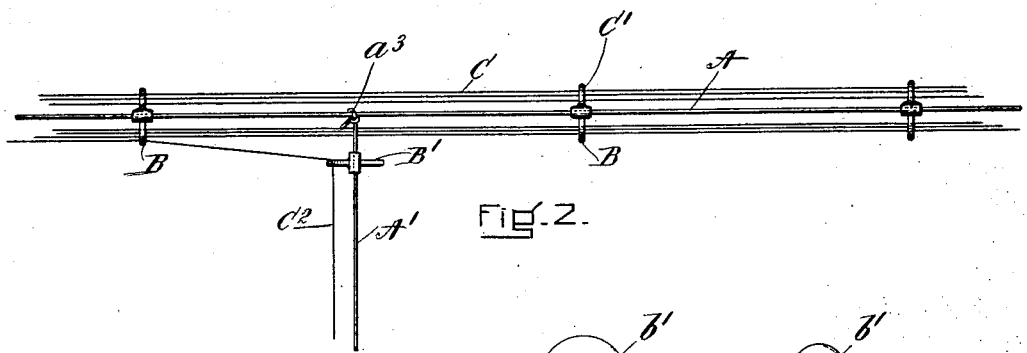
Figure 3:
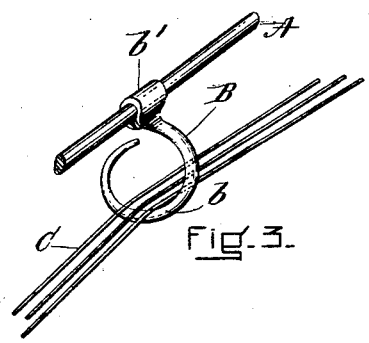
Figure 4:
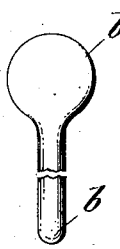
Figure 5:
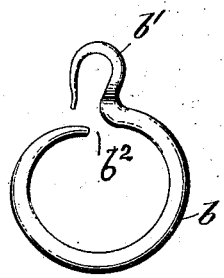

In the drawings hereto annexed, Figure 1 represents a span overhead telephone-wire from pole to pole containing and illustrating my improvements. Fig. 2 shows a mode of leading a branch wire or wires from any desired point from the principal line. Fig. 3 is a detail showing in perspective a preferred form of wire-sustaining hoop or support. Figs. 4 and 5 show in detail the method of constructing this preferred form of hoop.

Between the poles P, which are provided with the ordinary cross-arms $p$, I stretch a stout uninsulated wire which may be ordinary steel wire and which is capable of spanning great distances between supports and at the same time sustaining considerable loads. At suitable intervals, which may be anywhere from one foot to fifteen feet along the wire A, which is the span-wire, I attach supports B. These supports may vary in size and shape to suit the needs or notions of the constructor and may be attached to the span-wire in many conceivable ways. The form of support which I regard as suitable and preferable is shown in Figs. 3, 4, and 5. A stout iron or steel wire $b$ is rolled or flattened so as to form a clip $b'$. The clip $b'$ is bent over upon itself, as shown in Fig. 5, and the rod or wire $b$ is bent into a hoop. The hook formed by the clip $b'$ is then slipped over the span-wire A, Fig. 3, and is cramped or pinched thereon by means of a pair of pliers. These hoops or supports B can by this means be attached rapidly and easily to the span-wire A as the latter is being strung from pole to pole. The span-wire A, provided with the supports B, constitutes, in effect, a skeleton conduit and is now ready for the installation of the service-wires. These service-wires C are strung loosely through the supports B in practice, as required by the growing needs of the district in which the system is being installed. It is very easy to put the service-wires in place. All that is required is in the first place to lead a cord which can be run through the supports B when the span-wire is first put in place. Thereafter a similar leading-cord can be attached to the last service-wire strung along the supports and left there ready to draw in the next service-wire, or if the service-wire loops of the supports B are left sufficiently open at the top the service-wires may be passed into the loops sidewise. The service-wires C thus hang like a long skein from one support B to another and require very little tension to keep them fairly straight. Thus it is possible to use a very much lighter service-wire than has heretofore been regularly required. The service-wires themselves have to sustain none of the strain of suspension which falls upon a wire which has to sustain its own weight in a long span. The span-wire A, being a short wire preferably of steel, having no load of its own to carry is well adapted to sustain the weight of the service-wires and, furthermore, protects the service-wires in every way. Heretofore many accidents and defects in suburban telephone-lines have been due to the chafing of insulation by the swaying limbs of trees. With a span-wire A, such as herein described, and service-wires hanging relatively loosely therefrom there is little or no danger to the insulation from such causes, because the tree-limb merely pushes the service-wires aside and saws upon the stout span-wire, which is far more likely to sever the limb than to be broken thereby. Moreover, the span-wire being uninsulated is admirably adapted to carry off the current from accidentally-displaced electric-light wires or even to serve as a lightning-arrester. For these purposes I ground the wire A by leading a ground-wire $a'$ from the point $a$, where the span-wire is strung from the brace $p$, down the pole to which it is stapled at $a^2$, and thence to ground. I further carry out my plan of a main span-wire provided with supports at intervals for independently-strung service-wires by making lateral branch supports $A'$, Fig. 2. Where, as is often the case, it is inconvenient to locate a pole at just the right point from which to lead off a subscriber's wire, I secure the branch support $A'$ directly to the main span-wire A and secure thereto supports B, just as the same are secured to the main span-wire. One of these, as $B'$, is preferably placed close to the point of junction $a^3$ where the branch wire $A'$ is secured to the main span-wire. A single pair of wires, as $C^2$, is passed through the support $B'$ and thence led along the branch wire in the manner heretofore described. If the space from the main line to a subscriber's house is a short one, the wire, as $C'$, may be led directly from one of the supports B to the house. The hoops $b$ of the supports B are preferably in the form of a slightly-open ring, the space $b^2$ between the end of the hoop $b$ and the clip part $b'$ being wide enough to permit the passage of a single wire C sidewise and yet too narrow to permit the passage of the ordinary twisted pair of wires. By these means service-wires can be inserted sidewise into the hoops B either while the span-wire is being put in place or afterward.

What I claim, and desire to secure by Letters Patent, is—

1. The combination of a span-wire, supports at intervals on the span-wire, and service-wires or pairs, independently strung along the said supports.

2. The combination of an uninsulated span-wire, supports at intervals on the span-wire, and insulated service-wires or pairs, independently strung along the said supports.

3. The combination of a span-wire, a branch supporting-wire secured to and led from the span-wire, supports at intervals along the span-wire and branch supporting-wire, a skein of service-wires or pairs, independently strung along the supports on the span-wire, one or more of the service-wires leading from the skein to and along the supports on the branch supporting-wire.

4. The combination of a span-wire, hoops suspended therefrom at intervals, and service-wires or pairs, independently strung through the hoops.

Signed by me at Boston, Suffolk county, Massachusetts, this 26th day of May, 1902.

FRED C. LOCKE.

Witnesses:
   JOSEPH T. BRENNAN,
   GRACE E. GIBBONS.